US007251096B1

(12) United States Patent
Feliss et al.

(10) Patent No.: US 7,251,096 B1
(45) Date of Patent: Jul. 31, 2007

(54) SHOCK INDUCED CLEANING FOR HARD DISK DRIVES

(75) Inventors: Norbert A. Feliss, Sunnyvale, CA (US); Karl A. Flechsig, Los Gatos, CA (US); Donald R. Gillis, San Jose, CA (US); Sylvia L. Lee, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 11/257,574

(22) Filed: Oct. 24, 2005

(51) Int. Cl.
*G11B 21/02* (2006.01)

(52) U.S. Cl. .................................................... 360/75

(58) Field of Classification Search ..................... None
See application file for complete search history.

(56) References Cited

U.S. PATENT DOCUMENTS 5,204,793 A * 4/1993 Plonczak ................ 360/97.01
5,486,970 A * 1/1996 Lee et al. .................. 360/128
6,084,753 A * 7/2000 Gillis et al. ................ 360/128
6,226,155 B1 5/2001 Watanabe et al. ........ 360/254.8
6,292,323 B1 9/2001 Tanaka et al. ............... 360/75
6,480,361 B1 * 11/2002 Patterson ................ 360/254.3
6,674,613 B2 * 1/2004 Arikawa et al. ......... 360/254.7
6,707,634 B2 3/2004 Kagami et al. .............. 360/75
2004/0090706 A1 5/2004 Thomas, III et al. ....... 360/128
2004/0179288 A1 9/2004 Kagami et al. .............. 360/31

* cited by examiner

*Primary Examiner*—K. Wong

(57) ABSTRACT

Embodiments of the present invention recite a method for removing particles from a magnetic head support assembly of a hard disk drive. In one embodiment, a load/unload operation of the magnetic head support assembly is initiated. Particles are dislodged from the magnetic head support assembly by moving it across a physical feature of the load/unload ramp of the hard disk drive. This causes an acceleration of the magnetic head support assembly in a direction substantially perpendicular to its normal plane of movement which dislodges the particles. The particles are then conveyed away from the magnetic head support assembly in an airstream generated by the rotation of the disk pack of the hard disk drive.

20 Claims, 7 Drawing Sheets

SHOCK INDUCED CLEANING FOR HARD DISK DRIVES

FIELD OF THE INVENTION

Embodiments of the present invention are directed to the field of data storage devices.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

A conventional hard drive unit includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

In order to reduce damage to delicate components of the hard disk drive, extensive efforts are made to manufacture the hard disk drives in the cleanest environmental conditions possible. However, it is not uncommon for the hard disk drives to become contaminated with particles during the manufacturing process in spite of these efforts. Thus, particles can accumulate on the head stack assembly (HSA) and/or the head gimbal assembly (HGA) during normal operation of the disk drives due to well known Van der Waals and adhesion effects. However, these accumulated particles can be knocked loose during the shipping and/or installation of the hard disk drive. These particles may then contaminate the head/disk interface of the hard disk drive and cause irreparable damage.

SUMMARY OF THE INVENTION

Accordingly, a need exists to dislodge particles which may accumulate on the head gimbal assembly and head stack assembly. While meeting the above stated need, it would be advantageous to trap those dislodged particles to prevent future contamination of the hard disk drive.

Embodiments of the present invention provide a novel method and system which can dislodge particles that have accumulated on the head gimbal assembly and/or head stack assembly of a hard disk drive. Furthermore, embodiments of the present invention are able to advantageously trap those dislodged particles to prevent future contamination of the hard disk drive.

Embodiments of the present invention describe a method for removing particles from a magnetic head support assembly (e.g., a head gimbal assembly and head stack assembly of a hard disk drive). In one embodiment, a load/unload operation of the magnetic head support assembly is initiated. Particles are dislodged from the magnetic head support assembly by moving it across a physical feature of the load/unload ramp of the hard disk drive (e.g., bumps, holes, or a combination thereof). This causes an acceleration of the magnetic head support assembly in a direction substantially perpendicular to its normal plane of movement which dislodges the particles. The particles are then conveyed away from the magnetic head support assembly in an airstream generated by the rotation of the disk pack of the hard disk drive.

According to embodiments of the present invention, the dislodging of the particles is further enhanced by increasing the current supplied to the voice coil motor of the magnetic head support assembly. In so doing, the magnetic head support assembly is drawn across the bumps and/or holes of the load/unload ramp more quickly. This causes a greater acceleration of the magnetic head support assembly which further facilitates dislodging the particles. Additionally, in embodiments of the present invention, the magnetic head support assembly is caused to impact with a crash stop of the hard disk drive. The impact further dislodges the particles from the magnetic head support assembly.

In embodiments of the present invention, the dislodged particles are conveyed in the airstream generated by the disk pack of the hard disk drive when in operation. As the airstream passes through an air filter of the hard disk drive, the particles are advantageously removed.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
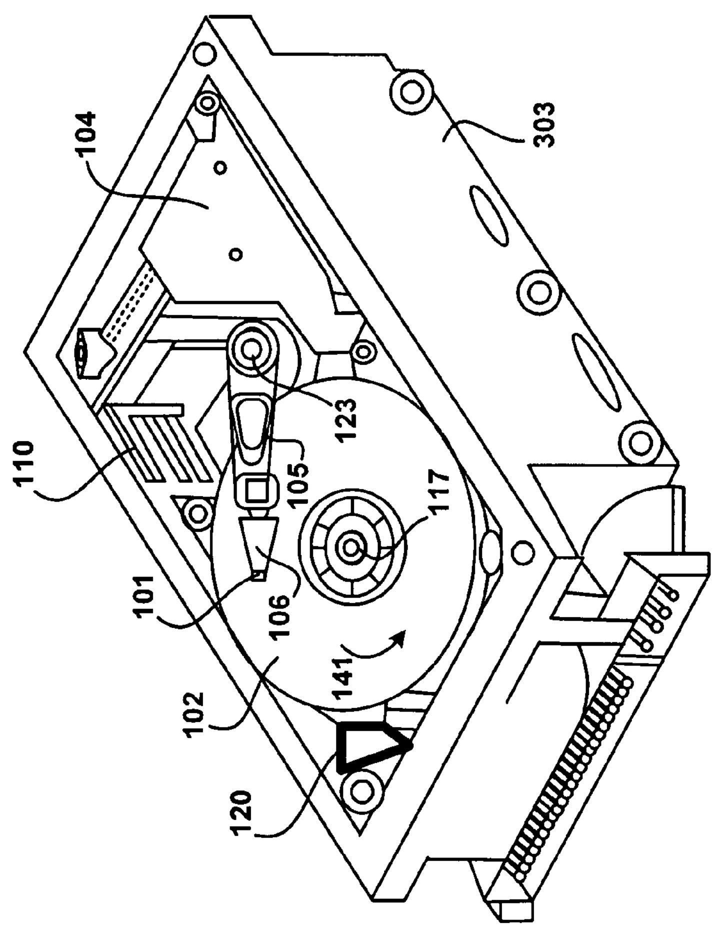
FIG. 1 is a perspective drawing of one embodiment of a magnetic hard disk file, or disk drive, in accordance with embodiments of the present invention.

With reference now to FIG. 1, a perspective drawing of one embodiment of a magnetic hard disk file or drive 100 in accordance with embodiments of the present invention is shown. Drive 100 has an outer housing or base 113 containing a disk pack having at least one media or magnetic disk 102. The disk or disks 102 are rotated (see arrows 141) by a spindle motor assembly having a central drive hub 117 which defines an axis of rotation of disk(s) 102. An actuator, also known as a "head stack assembly," comprises a plurality of parallel actuator arms 105 (one shown) in the form of a comb that is movably or pivotally mounted to base 113 about a pivot assembly 123. A controller not shown is also mounted to base 113 for selectively moving the comb of arms 105 relative to disk 102.

In the embodiment shown, each arm 105 has extending from it at least one cantilevered load beam and suspension 106. A magnetic read/write transducer or head is mounted on a slider 101 and secured to a flexure that is flexibly mounted to each suspension 106. The read/write transducer magnetically reads data from and/or magnetically write data to disk 102. The level of integration called the head gimbal assembly (HGA) typically comprises the read/write head, slider 101, and suspension 106. The slider 101 is usually bonded to the end of suspension 106. The head may be pico sized (e.g., approximately 1245×1000×300 microns) and formed from ceramic or intermetallic materials. The head also may be of "femto" size (approximately 850×700×230 microns) and may be pre-loaded against the surface of disk 102 (in the range two to ten grams) by suspension 106. For the purposes of the present invention, the term "magnetic head support assembly" generally refers to a level of integration comprising the head stack assembly and the head gimbal assembly described above.

Suspensions 106 have a spring-like quality, which biases or urges the air-bearing surface of the slider 101 against the disk 102 to cause the slider 101 to fly at a precise distance from the disk when drive 100 is in normal operation. An actuator 104 (e.g., a voice coil motor) is also mounted to arms 105 opposite the head gimbal assemblies. Movement of the actuator 104 by the controller moves the head gimbal assemblies along radial arcs across tracks on the disk 102 until the read/write transducer is positioned above the desired data track. The head gimbal assemblies operate in a conventional manner and typically move in unison with one another, unless drive 100 uses multiple independent actuators (not shown) wherein the arms can move independently of one another. A load/unload ramp 110 is coupled with housing 113 and is used to load the heads onto the disk pack when drive 100 begins operation and unload the heads from the disk pack when operation of drive 100 ceases.

Figure 2:
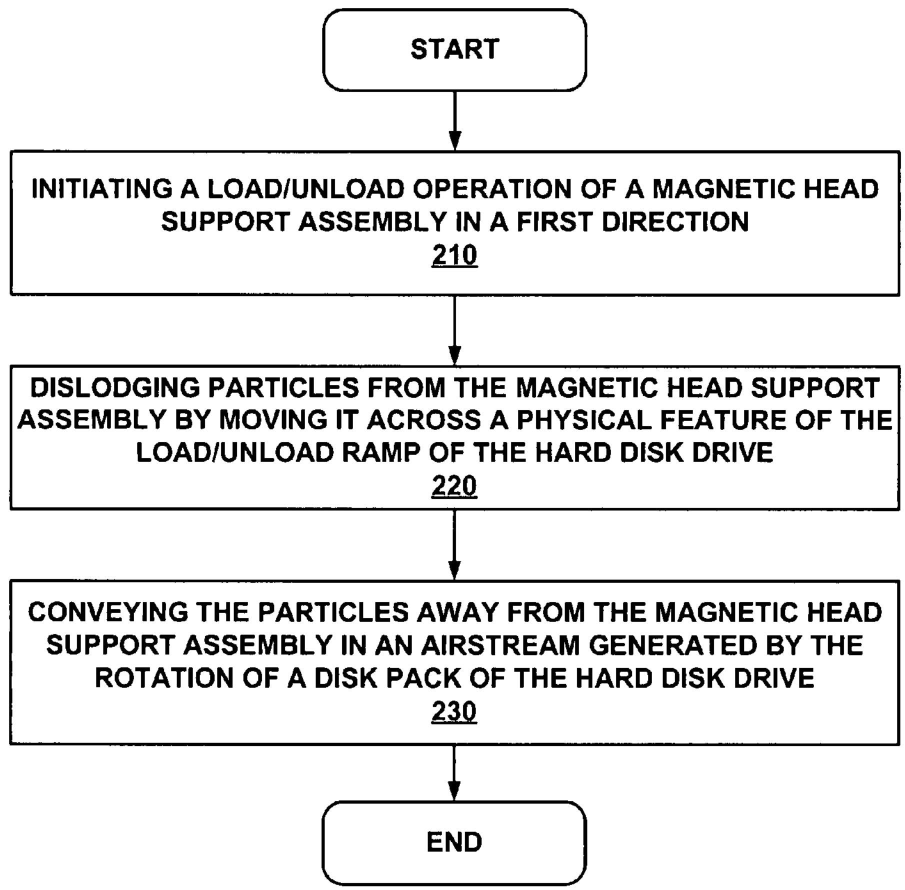
FIG. 2 is a flowchart of a method for removing particles from a magnetic head support assembly of a hard disk drive in accordance with another embodiment of the present invention.

FIG. 2 is a flowchart of a method 200 for removing particles from a magnetic head support assembly of a hard disk drive in accordance with another embodiment of the present invention. In step 210 of FIG. 2, a load/unload operation of a magnetic head support assembly is initiated in a first direction. In embodiments of the present invention, the load/unload operation may be initiated as a result of a normal start-up or shut-down operation of the hard disk drive 100. In another embodiment, the load/unload operation may be initiated in response to a diagnostic function being performed by hard disk drive 100 such as a self-monitoring and reporting technology (SMART) algorithm. In another embodiment, the load/unload operation may be initiated as a step in the manufacturing process of hard disk drive 100.

In step 220 of FIG. 2, particles are dislodged from the magnetic head support assembly by moving it across a physical feature of the load/unload ramp of the hard disk drive which causes an acceleration of the magnetic head support assembly in a second direction. As will be described in greater detail below, embodiments of the present invention utilize a physical feature which is incorporated into the load/unload ramp to cause an acceleration of the magnetic head support assembly. In embodiments of the present invention, this acceleration is in a direction that is substantially perpendicular to the direction the magnetic head support assembly normally travels during a load/unload operation. In so doing, sufficient force is generated to dislodge particles which may have accumulated on the magnetic head support assembly. It is noted that in embodiments of the present invention, only a portion of the magnetic head support assembly may be accelerated in this direction.

In embodiments of the present invention, dislodging of the particles may be enhanced by impacting the magnetic head support assembly into a crash stop of the hard disk drive. In other words, the sudden deceleration of the magnetic head support assembly caused by the impact will facilitate dislodging the accumulated particles. In embodiments of the present invention, the effects of this impact may be accentuated by increasing the electrical current supplied to the motor (e.g., actuator 104) controlling the magnetic head support assembly. In other words, more current is supplied to actuator 104 to cause it to impact the crash stop with greater force. In embodiments of the present invention, the current is controlled such that the magnetic head support assembly will not rebound from the crash stop after hitting it. Furthermore, the current is controlled so that the head gimbal assembly of the disk drive is not damaged when moved across load/unload ramp.

In step 230 of FIG. 2, the particles are conveyed away from the magnetic head support assembly in an airstream generated by the rotation of a disk pack of the hard disk drive. In embodiments of the present invention, the dislodged particles are conveyed away from the magnetic head support assembly to an air filter which removes the particles from the airstream. Typically, the particles will not contaminate the head/disk interface due to the centrifugal forces generated by the rotation of the disk pack and the corresponding airflow.

Embodiments of the present invention facilitate removing particles which have accumulate on the magnetic head support assembly without requiring significant re-design of existing components, or significant changes to the manufacturing process of the hard disk drive. Thus, embodiments of the present invention provide a cost effective method for advantageously improving the reliability and service life of the hard disk drive.

Figure 3:
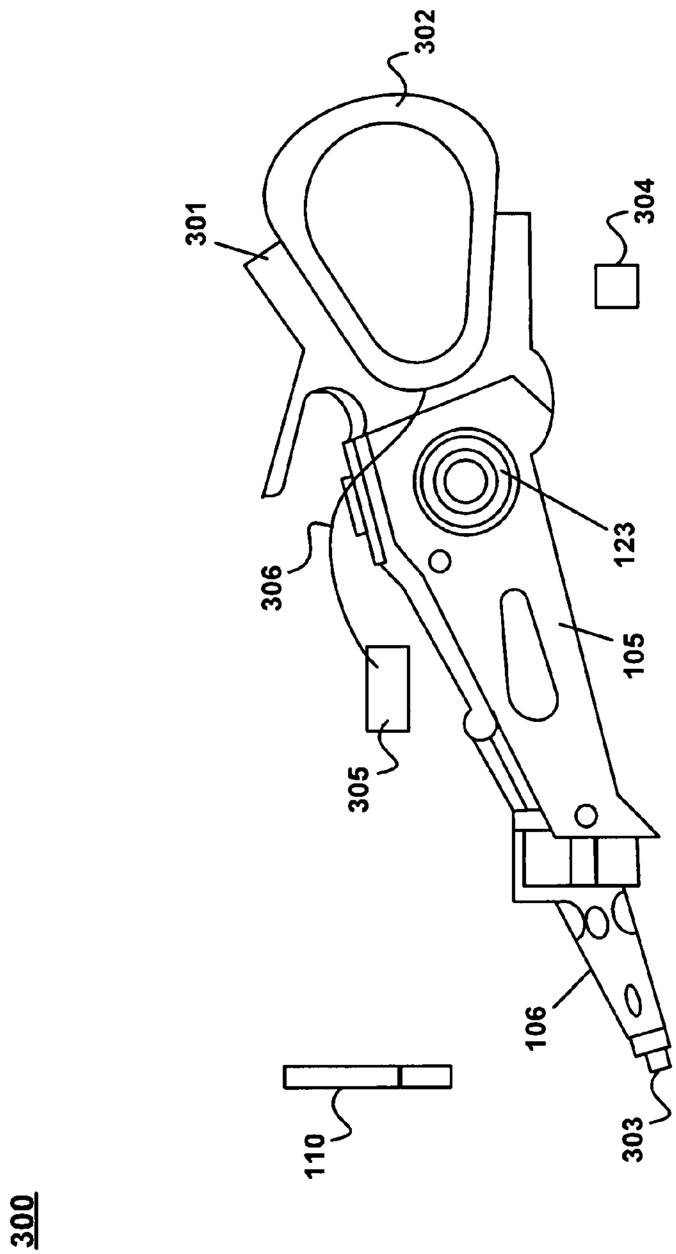
FIG. 3 is a top view of an exemplary magnetic head support assembly in accordance with another embodiment of the present invention.

FIG. 3 is a top view of an exemplary magnetic head support assembly 300 in accordance with embodiments of the present invention. As described above with reference to FIG. 1, magnetic head support assembly 300 comprises and actuator arm 105 coupled with a suspension 106. A slider body 101, to which a magnetic read/write head (not shown) is coupled, is also coupled with suspension 106. Actuator arm 105 rotates around pivot assembly 123 and further comprises comb 301, also known as a "yoke," which holds a coil 302. Coil 302 comprises a component of the voice coil motor which provides electro-motive force for magnetic head support system 300. It is appreciated that there are a variety of coil designs which may be used in embodiments of the present invention including co-molded coils and bonded coils.

Also shown in FIG. 3 is a crash stop 304 which limits the range of motion of magnetic head support assembly 300 with reference to the outer diameter of the disk pack and load/unload ramp 110. In embodiments of the present invention, load/unload ramp 110 engages with a tab 303 when magnetic head support system is moved into position. Crash stop 304 then limits the motion of magnetic head support assembly 300 to prevent damage due to over-rotation. Controller 305 supplies control signals to coil 302 via coupling 306.

Figure 4:
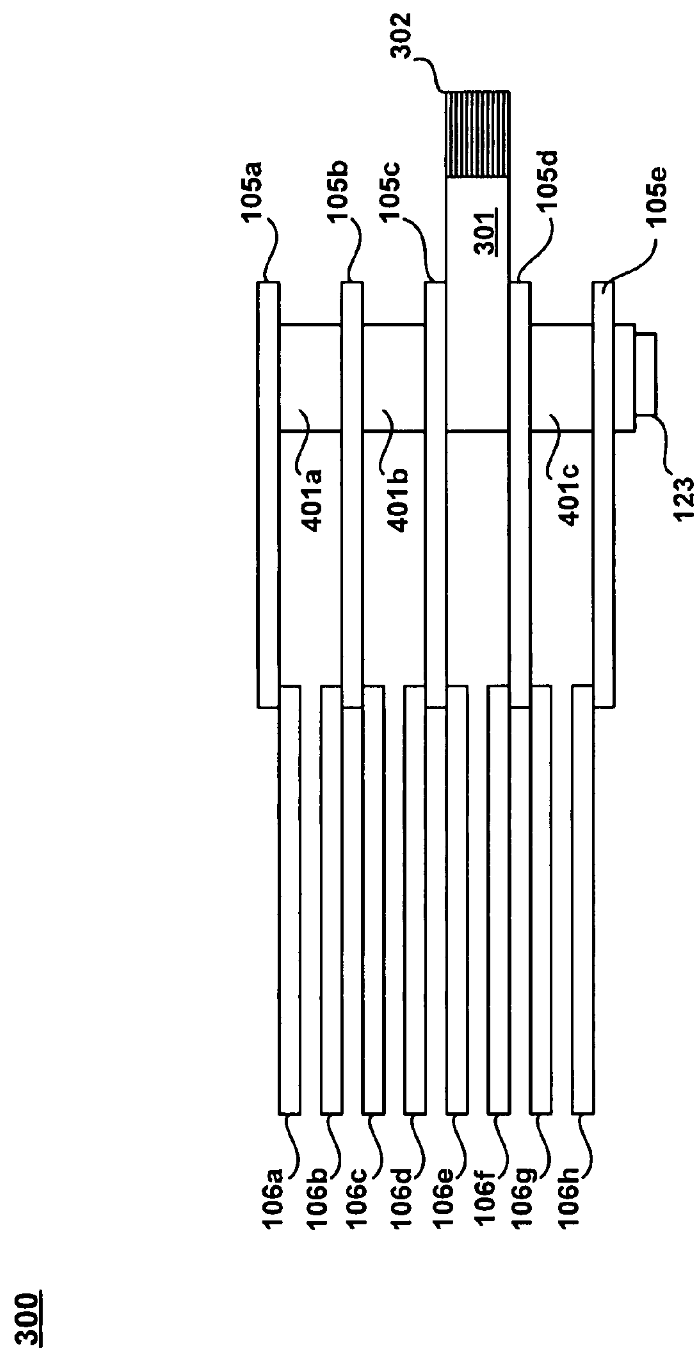
FIG. 4 is a side view of an exemplary magnetic head support assembly in accordance with another embodiment of the present invention.

FIG. 4 is a side view of an exemplary magnetic head support assembly 300 in accordance with embodiments of the present invention. In FIG. 4, a plurality of actuator arms 105*a–e* are coupled around pivot assembly 123. Typically, spacers (e.g., 401*a–c*) are inserted between the individual actuator arms 105 to provide spacing to fit between the individual disks of the disk pack. Also shown in FIG. 4 is comb 301, which also serves as a spacer between actuator arms 105*c* and 105*d*, and coil 302. It is noted that while the embodiment of FIG. 4 shows a stacked arm assembly, embodiments of the present invention are well suited to be used with one-piece (e.g., cast and/or machined) actuator combs. Coupled with each of actuator arms 105 is at least one respective suspensions 106. As shown in FIG. 4, the top actuator arm 105*a* and bottom actuator arm 105*e* are only coupled with a single suspension (e.g., suspensions 106*a* and 106*h* respectively) due to the relative placement of the actuator arms with reference to disk pack 102.

Figure 5:
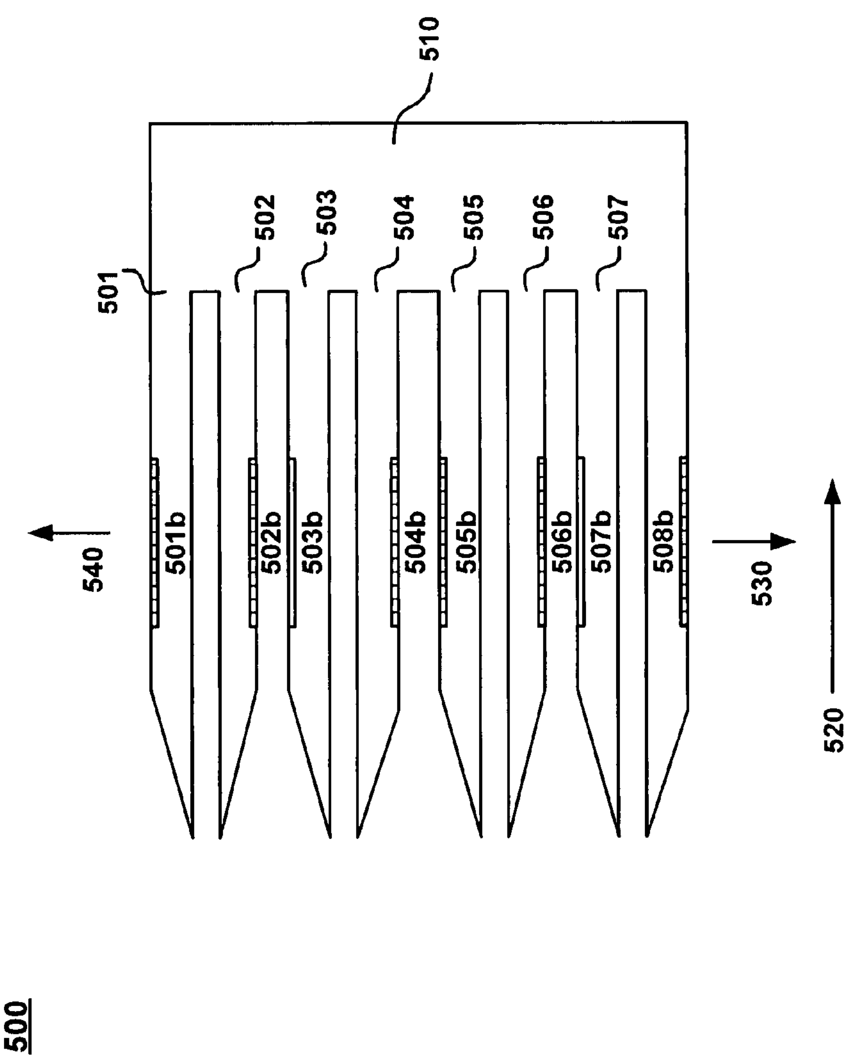
FIG. 5 is a side view of an exemplary load/unload ramp assembly of a hard disk drive in accordance with embodiments of the present invention.

FIG. 5 is a side view of an exemplary load/unload ramp assembly 500 of a hard disk drive in accordance with embodiments of the present invention. In the embodiment of FIG. 5, load/unload ramp assembly 500 comprises a plurality of arms (e.g., 501, 502, 503, 504, 505, 506, 507, 508) that are coupled with a support section 510. In embodiments of the present invention, load/unload ramp assembly 500 is coupled with housing 113 via support section 510.

In the embodiment of FIG. 5, each arm further comprises a ramp section (e.g., 501*a*, 502*a*, 503*a*, 504*a*, 505*a*, 506*a*, 507*a*, 508*a*) which engages tab 303 of a respective suspension when magnetic head support assembly 300 is rotated in the direction indicated by arrow 520. In so doing, the respective slider and magnetic read/write head is moved away from the surface of its magnetic disk surface.

In the embodiment of FIG. 5, each arm of load/unload ramp assembly 500 further comprises a physical feature (e.g., 501*b*, 502*b*, 503*b*, 504*b*, 505*b*, 506*b*, 507*b*, 508*b*) for causing an acceleration of the head gimbal assemblies of magnetic head support assembly 300 in a direction that is substantially perpendicular to the direction of arrow 520 (e.g., arrows 530 and 540) when a load/unload operation is initiated. In so doing, physical features 501*b*, 502*b*, 503*b*, 504*b*, 505*b*, 506*b*, 507*b*, 508*b* cause a vibration or shock to magnetic head support assembly 300 which dislodges particles that may have become attracted thereto In other words, when one of the tabs (e.g., 303) of a HGA passes over one of the physical features, a vibration or shaking of the HGA dislodges particles which have been attracted to magnetic head support assembly 300.

In embodiments of the present invention, the particles removed from magnetic head support assembly 300 enter the airstream which is generated by disk pack 102 when drive 100 is in operation and are conveyed away from magnetic head support assembly 300. Typically, the airstream follows the direction of travel of the disks (e.g., 141 of FIG. 1). In embodiments of the present invention, these particles are then advantageously removed from the airstream by filter 120.

In embodiments of the present invention, the speed at which magnetic head support assembly 300 passes over the physical features can be controlled by controlling the amount of current passed to the voice coil magnet assembly (e.g., coil 302 of FIG. 3). Thus, if a greater amount of vibration is desired, a greater amount of current is passed to the voice coil magnet assembly to increase the velocity of magnetic head support assembly 300 in the direction indicated by arrow 520. If it is desired to decrease the velocity of magnetic head support assembly 300 in the direction indicated by arrow 520 (e.g., to reduce the likelihood of damage to components of magnetic head support assembly), the amount of current supplied to the voice coil magnet assembly may be reduced.

In embodiments of the present invention, additional removal of particles from magnetic head support assembly 300 may be accomplished by intentionally impacting it with crash stop 304. As a result, particles attracted to magnetic head support assembly 300 which were not removed when passing over the physical features 501*b*–508*b*, may be dislodged from magnetic head support assembly 300 when it impacts with crash stop 304. As described above, the amount of current supplied to the voice coil motor may be varied to increase or decrease the amount of force with which magnetic head support assembly 300 impacts with the crash stop. For example, if magnetic head support assembly 300 impacts with the crash stop with too much force, it may rebound from the impact and bounce back onto the surface of the disk pack 102. Thus, in embodiments of the present invention, controller 305 may be used to control the speed of magnetic head support assembly 300 when loading, or unloading, magnetic head support assembly 300 to/from disk pack 102. Furthermore, as described above, embodiments of the present invention may be implemented as a step in the manufacturing process of disk drive 100 so that particles attracted to magnetic head support assembly 300 may be removed therefrom prior to shipping. Additionally, embodiments of the present invention may be implemented every time magnetic head support assembly 300 is loaded/unloaded from load/unload ramp assembly 500, or as a result of running a SMART algorithm.

Figure 6:
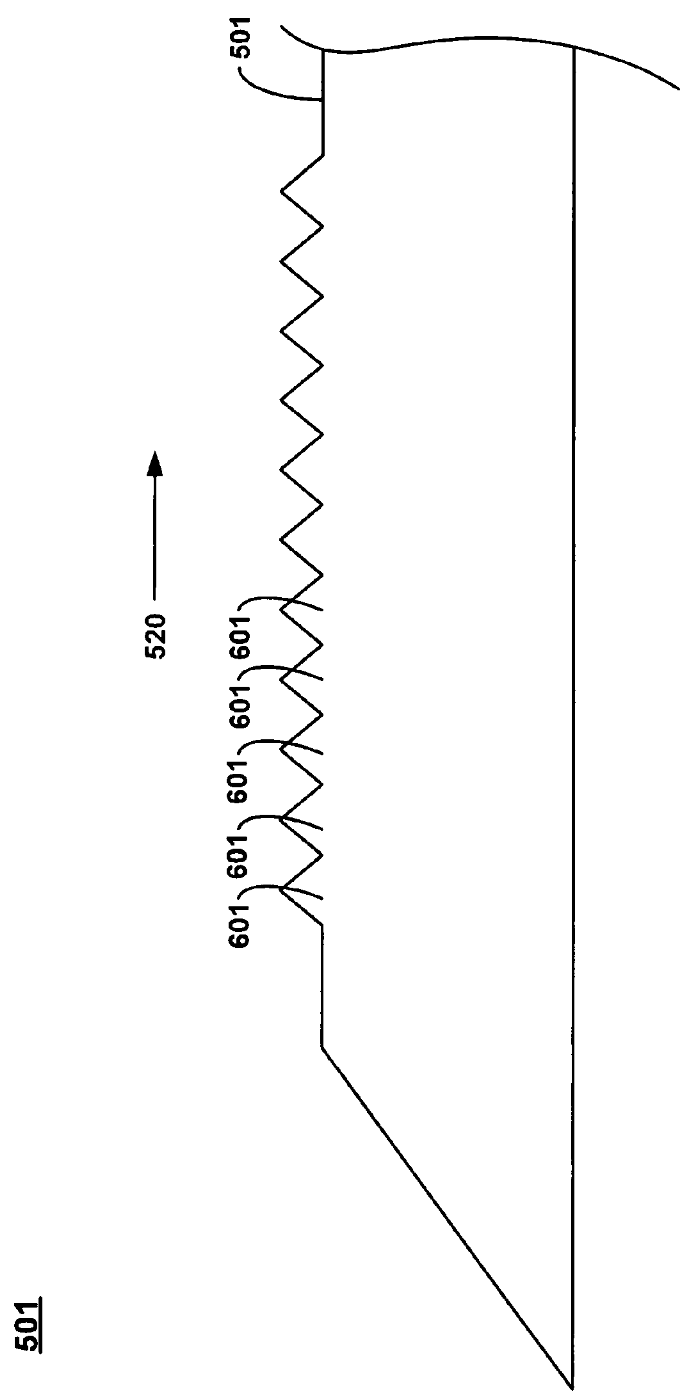
FIG. 6 shows in greater detail, an exemplary physical feature of a load/unload ramp of a hard disk drive in accordance with embodiments of the present invention.
Figure 7:
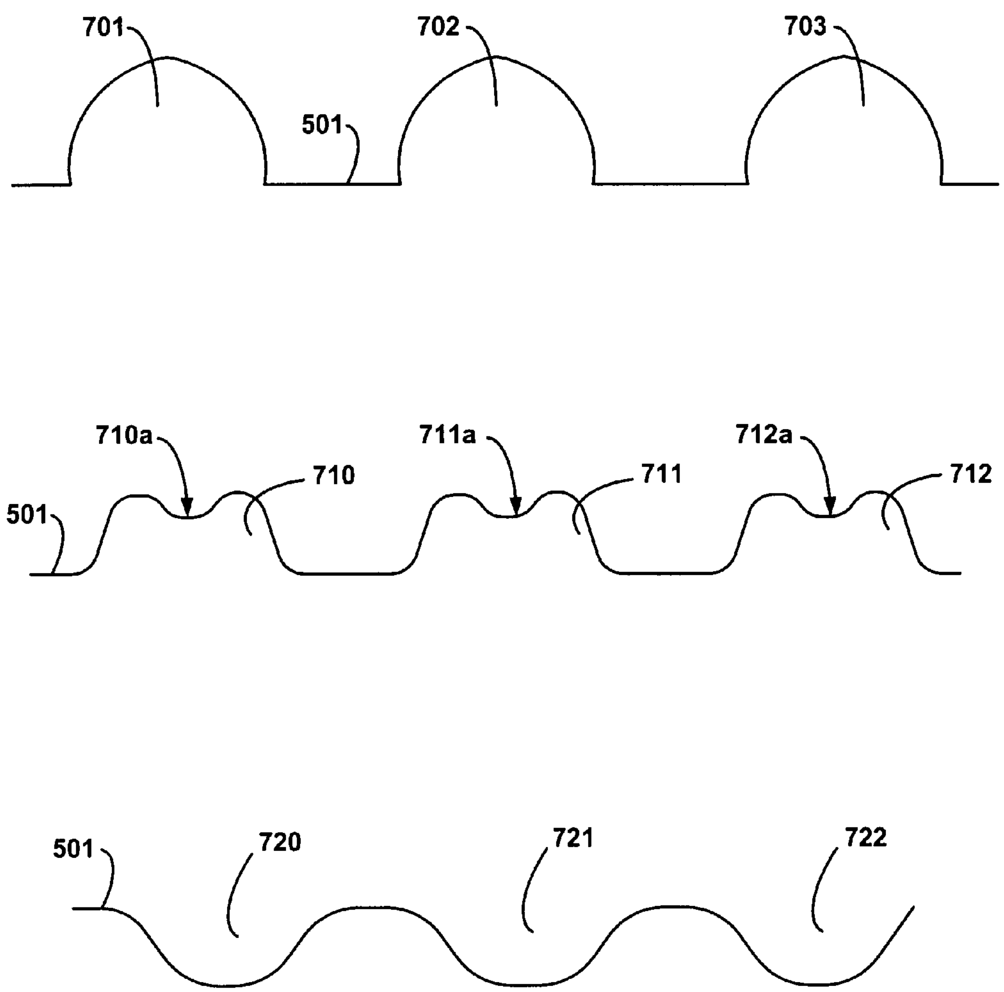
FIG. 7 shows the configuration of a variety of physical features of a load/unload ramp in accordance with embodiments of the present invention.

FIG. 6 shows in greater detail, an exemplary physical feature 501*a* of a load/unload ramp 501 in accordance with embodiments of the present invention. As shown in FIG. 6, physical feature 501*a* comprises a series or pattern of bumps 601 which may engage one of the tabs 303 when magnetic head support assembly 300 is moving in the direction indicated by arrow 520. As this occurs, a vibration of magnetic head support assembly 300 is initiated which can dislodge particles which have become attracted to magnetic head support assembly 300. It is appreciated that while the embodiment of FIG. 6 shows that physical feature 501*a* has a saw-tooth appearance, in embodiments of the present invention physical feature 501*a* may be configured differently. For example, as shown in FIG. 7, physical feature 501*b* may be configured as a series or pattern of rounded bumps which protrude above the surface of ramp arm 501 (e.g., 701, 702, and 703). In another embodiment, physical feature 501*b* may be configured as a series of bumps (e.g., 710 and 711) which protrude above the surface of ramp arm 501 which have at least one depression (e.g., 710*a* and 711*a* respectively). In another embodiment, physical feature 501*b* comprises a series of depressions (e.g., 720, 721, and 722) extending below the surface of ramp arm 501. It is noted that the configurations shown are exemplary and that embodiments of the present invention are not limited to these configurations alone. Furthermore, it is appreciated that the spacing of the bumps/depressions of physical feature 501*b* may be selected to implement a greater or lower frequency of vibration of the HGAs of magnetic head support assembly.

The preferred embodiment of the present invention, shock induced cleaning for hard disk drives, is thus described. While the present invention has been described in particular embodiments, it should be appreciated that the present invention should not be construed as limited by such embodiments, but rather construed according to the following claims.

What is claimed is:

1. A method of removing particles from a magnetic head support assembly of a hard disk drive, said method comprising:

initiating a load/unload operation of said magnetic head support assembly in a first direction;

moving said magnetic head support assembly across a physical feature of a load/unload ramp of said hard disk drive to accelerate a head gimbal assembly of said magnetic head support assembly in a second direction that is substantially perpendicular to said first direction to dislodge said particles from said magnetic head support assembly; and conveying said particles away from said magnetic head support assembly in an airstream generated by the rotation of at least one magnetic disk of said hard disk drive.

2. The method as recited in claim 1 further comprising impacting said magnetic head support assembly into a crash stop mechanism to further dislodge said particles.

3. The method as recited in claim 1 further comprising removing said particles from said airstream.

4. The method as recited in claim 3 further comprising filtering said airstream with a filter to remove said particles.

5. The method as recited in claim 1 further comprising controlling acceleration of said head gimbal assembly of said magnetic head support assembly in said second direction by controlling the current supplied to a motor coupled therewith.

6. The method as recited in claim 1 further comprising controlling velocity of said head gimbal assembly of said magnetic head support assembly in said first direction by controlling the current supplied to a motor coupled therewith.

7. The method as recited in claim 1 wherein said physical feature is selected from a group consisting essentially of a protrusion above a surface of said load/unload ramp; and a depression below said surface of said load/unload ramp.

8. A data storage device comprising:

a housing;

a disk pack mounted to the housing and comprising at least one disk that is rotatable relative to the housing, the disk pack defining an axis of rotation and a radial direction relative to the axis;

a magnetic head support assembly mounted to the housing and being movable in a first direction that is perpendicular to said axis of rotation; and a load/unload ramp mounted to the housing and comprising at least one physical feature for accelerating a head gimbal assembly of said magnetic head support assembly in a second direction that is substantially perpendicular to said first direction for dislodging particles from said magnetic head support assembly into an airstream generated by said disk pack.

9. The data storage device of claim 8 further comprising a crash stop mechanism for halting movement of said magnetic head support assembly in said first direction and wherein said halting facilitates particles being dislodged from said magnetic head support assembly.

10. The data storage device of claim 8 further comprising:

a filter for removing said particles from said airstream.

11. The data storage device of claim 8 further comprising a motor coupled with said magnetic head support assembly and wherein said head gimbal assembly of said magnetic head support assembly is accelerated in said second direction by controlling current supplied to a motor coupled therewith.

12. The data storage device of claim 11 wherein a velocity of said head gimbal assembly of said magnetic head support assembly in said first direction is controlled by limiting the current supplied to said motor.

13. The data storage device of claim 8 wherein said physical feature is selected from a group consisting essentially of a protrusion above the surface of said load/unload ramp; and a depression below the surface of said load/unload ramp.

14. A hard disk drive system comprising:

a disk pack comprising at least one hard disk;

a load/unload means for removing a magnetic head support assembly of said hard disk drive system from contact with said disk pack when not in operation; and an acceleration means coupled with said load/unload means for causing the acceleration of a head gimbal assembly of said magnetic head support assembly in a direction that is parallel with an axis of rotation of said disk pack and wherein said acceleration facilitates particles from said magnetic head support assembly entering an airstream generated by rotation of said disk pack.

15. The hard disk drive system of claim 14 further comprising a motor means for impacting said magnetic head support system into a crash stop of said hard disk drive system and wherein said impacting further facilitates particles from said magnetic head support assembly entering an airstream generated by rotation of said disk pack.

16. The hard disk drive system of claim 15 further comprising a current control means coupled with said motor means for limiting the acceleration of said head gimbal assembly of said magnetic head support assembly by controlling the current supplied to said motor means.

17. The hard disk drive system of claim 16 wherein said current control means further limits the impacting of said magnetic head support system into said crash stop by controlling the current supplied to said motor means.

18. The hard disk drive system of claim 14 further comprising means for removing said particles from said airstream.

19. The hard disk drive system of claim 18 wherein said means for removing comprises an air filter.

20. The hard disk drive system of claim 14 wherein said acceleration means is selected from a group consisting essentially of a protrusion from the surface of said load/unload means; and a depression in the surface of said load/unload means.

* * * * *